United States Patent
Liu et al.

(10) Patent No.: US 7,081,030 B2
(45) Date of Patent: Jul. 25, 2006

(54) METHOD FOR MAKING A CARBON NANOTUBE-BASED FIELD EMISSION DISPLAY

(75) Inventors: Liang Liu, Beijing (CN); Shou Shan Fan, Beijing (CN)

(73) Assignees: Tsinghua University, Beijing (CN); Hon Hai Precision Ind. Co., Ltd., Tu-Cheng (TW)

(*) Notice: Subject to any disclaimer, the term of this patent is extended or adjusted under 35 U.S.C. 154(b) by 131 days.

(21) Appl. No.: 10/811,414

(22) Filed: Mar. 26, 2004

(65) Prior Publication Data

US 2004/0192153 A1 Sep. 30, 2004

(30) Foreign Application Priority Data

Mar. 26, 2003 (CN) ............................ 03 1 14064

(51) Int. Cl.
*H01J 9/00* (2006.01)
*H01J 9/04* (2006.01)
(52) U.S. Cl. ..................... 445/24; 445/50; 445/51
(58) Field of Classification Search ............. 445/50
See application file for complete search history.

(56) References Cited

U.S. PATENT DOCUMENTS

| 6,436,221 B1 | 8/2002 | Chang et al. |
| 6,440,761 B1 | 8/2002 | Choi |
| 6,515,415 B1 | 2/2003 | Han et al. |
| 2004/0192152 A1* | 9/2004 | Liu et al. ................. 445/51 |

* cited by examiner

*Primary Examiner*—Mariceli Santiago
*Assistant Examiner*—Anne Hines
(74) *Attorney, Agent, or Firm*—Wei Te Chung

(57) ABSTRACT

A method for making a field emission display includes: (1) providing a detachable substrate having a plane surface; (2) forming gate electrodes in a predetermined pattern on the plane surface of the detachable substrate; (3) forming an intermediate layer on the gate electrodes; (4) forming a catalyst layer on the intermediate layer; (5) forming a spacer in a manner corresponding to a predetermined pattern on the layer of catalyst material; (6) forming carbon nanotube arrays extending from the layer of catalyst material; (7) forming cathode electrodes on first ends of the carbon nanotube arrays; and (8) removing the detachable substrate, and removing portions of the intermediate layer corresponding to positions of the carbon nanotube arrays so as to expose opposite second ends of the carbon nanotube arrays that face toward the gate electrodes.

19 Claims, 4 Drawing Sheets

METHOD FOR MAKING A CARBON NANOTUBE-BASED FIELD EMISSION DISPLAY

BACKGROUND OF THE INVENTION

1. Field of the Invention

The present invention relates to a method for making a field emission display, and particularly to a method for making a carbon nanotube based field emission display.

2. Description of Related Art

Carbon nanotubes are very small tube-shaped structures having the composition of a graphite sheet rolled into a tube. Carbon nanotubes produced by arc discharge between graphite rods were first discovered and reported in an article by Sumio Iijima entitled "Helical Microtubules of Graphitic Carbon" (Nature, Vol. 354, Nov. 7, 1991, pp. 56–58). Carbon nanotubes have electrical conductance related to their structure, are chemically stable, and can have very small diameters (less than 100 nanometers) and large aspect ratios (length/diameter). Due to these and other properties, it has been suggested that carbon nanotubes can play an important role in field emission display devices.

U.S. Pat. No. 6,339,281 discloses a method for making a triode-structure carbon nanotube based field emission display. The method comprises the steps of:

(1) forming a cathode electrode, a gate insulation layer and a gate electrode in sequence on a glass substrate;
(2) forming a gate opening in the gate electrode;
(3) forming a micro-cavity in the gate insulation layer; and
(4) forming a catalyst layer on the cathode electrode within the micro-cavity;

and growing carbon nanotubes on the catalyst layer by chemical vapor deposition.

However, in practice, there are the following persistent problems in fabricating carbon nanotube based field emission displays by chemical vapor deposition:

1. In order to achieve a uniform illuminance, a distance between gate electrodes and carbon nanotubes should be kept uniformly constant over a large area. However, it is difficult to assure a desired uniformity of heights of the carbon nanotubes over a large area by chemical vapor deposition.
2. In order to lower a threshold voltage of the gate electrodes, the distance between the gate electrodes and the carbon nanotubes should be as little as possible. However, it is difficult to precisely control a height of the carbon nanotubes to a micro-scale level by chemical vapor deposition.
3. A carbon nanotube array formed by chemical vapor deposition invariably contains a layer of randomly distributed carbon nanotubes, catalyst particles and a tiny amount of amorphous carbon, which impairs field emission performance of the carbon nanotube arrays and reduces the field emission display's product life cycle.

SUMMARY OF THE INVENTION

In order to resolve the above-mentioned problems, a method according to the present invention for making a carbon nanotube based field emission display comprises the steps of:

(1) providing a detachable substrate having a plane surface;
(2) forming gate electrodes in a predetermined pattern on the plane surface of the detachable substrate;
(3) forming an intermediate layer on the gate electrodes;
(4) forming a catalyst layer on the intermediate layer;
(5) forming a spacer in a manner corresponding to a predetermined pattern on the layer of catalyst material;
(6) forming carbon nanotube arrays extending from the layer of catalyst material;
(7) forming cathode electrodes on first ends of the carbon nanotube arrays; and
(8) removing the detachable substrate, and removing portions of the intermediate layer corresponding to positions of the carbon nanotube arrays so as to expose opposite second ends of the carbon nanotube arrays that face toward the gate electrodes.

These and other features, aspects and advantages of the invention will become more apparent from the following detailed description, claims and the accompanying drawings, in which:

DETAILED DESCRIPTION OF THE PRESENT INVENTION

Reference will now be made to the drawings to describe the preferred method of the present invention in detail.

Figure 13:
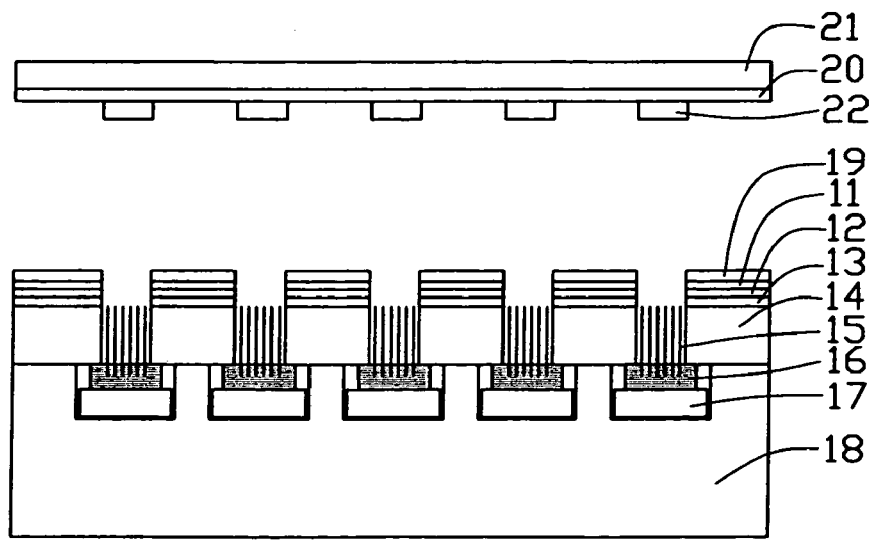
FIG. 13 is a similar to FIG. 12, but showing the subassembly thereof assembled with a display screen to obtain a field emission display.

Referring to FIG. 13, a field emission display produced by the preferred method of the present invention comprises: cathode electrodes 17, an anode electrode 20, gate electrodes 19 arranged between the cathode electrodes 17 and the anode electrode 20, carbon nanotube arrays 15, and a spacer 14. A layer of negative feedback resistance 16 is formed between first ends of the carbon nanotube arrays 15 and the cathode electrodes 17. Opposite second ends of the carbon nanotube arrays 15 are flush with corresponding ends of the spacer 14 that are nearest the gate electrodes 19. The cathode electrodes 17 are packaged with a bottom cover 18.

Figure 1:
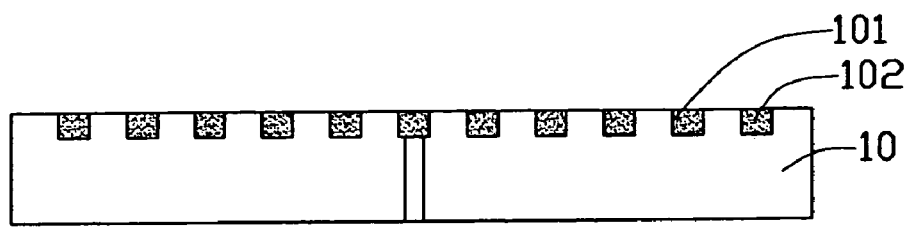
FIG. 1 is a schematic side elevation view of a detachable substrate used in a preferred method for making a field emission field display in accordance with the present invention.

Referring to FIG. 1, a detachable substrate 10 having a flat surface (not labeled) is first provided. Preferably, a plurality of grooves or apertures 101 is defined in the surface of the detachable substrate 10, for facilitating removal of the detachable substrate 10 in a later step. The surface is preferably coated with a removable material such as wax, so as to achieve a variation in flatness of the surface of less than 1 μm. The detachable substrate 10 is generally made of refractory material which is capable of resisting high temperatures. A first protective layer (not shown) is then formed on the surface of the detachable substrate 10. The first protective layer is for protecting the gate electrodes 17 from being obstructed by carbonaceous materials that are generally by-products of formation of the carbon nanotube arrays 15 in a later step. Generally, the first protective layer comprises material selected from the group consisting of glass, silicon, silicon oxide, mica, and ceramic material. The first protective layer has a thickness in the range from 10 nm~10 μm. It should be noted that formation of the first protective layer is not an essential step in practicing the present invention.

Figure 2:
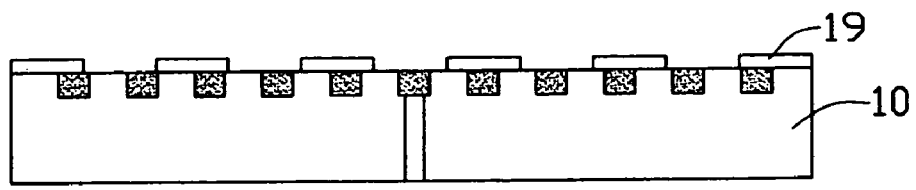
FIG. 2 is similar to FIG. 1, but showing gate electrodes formed on a first protective layer of the detachable substrate.

Referring to FIG. 2, the gate electrodes 19 are formed on the first protective layer in a predetermined pattern. The gate electrodes 19 can be formed by e-beam evaporation, thermal evaporation or sputtering, each of these methods being performed in cooperation with either a mask or photolithography. The gate electrodes 19 can be made of metallic material. The metallic material is preferably capable of withstanding temperatures of about 700° C., and preferably has a coefficient of thermal expansion compatible with those of the first protective layer, an intermediate layer 11 (see FIG. 3), a second protective layer 12 (see FIG. 4), and the spacer 14.

Figure 3:
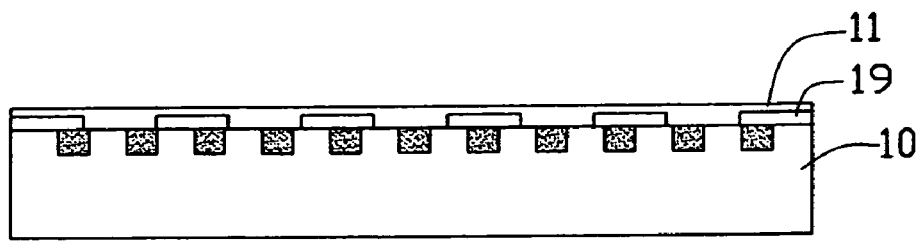
FIG. 3 is similar to FIG. 2, but showing an intermediate layer formed on the gate electrodes.

Referring to FIG. 3, the intermediate layer 11 is formed on the gate electrodes 19 by coating or printing. The intermediate layer 11 may alternatively be substituted by a thin plate. The intermediate layer 11 is for controlling a distance between the carbon nanotube arrays 15 and the gate electrodes 19, and is also used as a substrate for growing of the carbon nanotube arrays 15 in the later step. A thickness of the intermediate layer 11 is in the range from 1 μm to 1000 μm, and preferably in the range from 10 μm to 200 μm. A variation in flatness of the intermediate layer 11 is preferably controlled to be less than 1 μm. The intermediate layer 11 is generally made of material which is capable of being processed by photolithography and enduring temperatures of about 700° C. Accordingly, the intermediate layer 11 generally comprises material selected from the group consisting of glass, silicon, silicon oxide, mica, and ceramic material.

Figure 4:
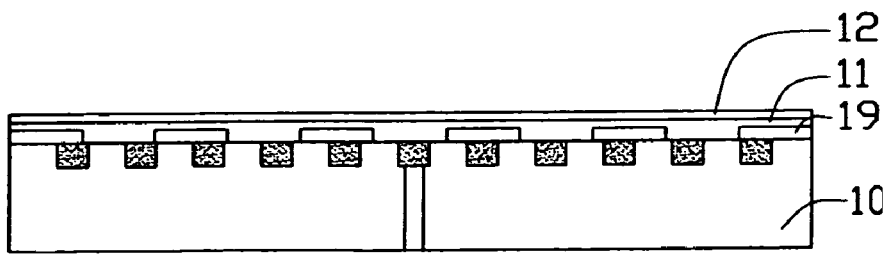
FIG. 4 is similar to FIG. 3, but showing a second protective layer formed on the intermediate layer.

Referring to FIG. 4, preferably, a second protective layer 12 is deposited on the intermediate layer 11 by e-beam evaporation or sputtering. The second protective layer 12 is for protecting carbon nanotube arrays 15 from being damaged or destroyed during a later step of wet etching. Preferably, the second protective layer 12 is made of silicon. Alternatively, the second protective layer 12 can be made of another suitable material which is capable of withstanding a wet etching process, and yet which is removable by a dry etching process. The second protective layer 12 is as thin as possible, and preferably in the range from 10 nm to 1 μm. It should be noted that deposition of the second protective layer 12 is not an essential step in practicing the present invention.

Figure 5:
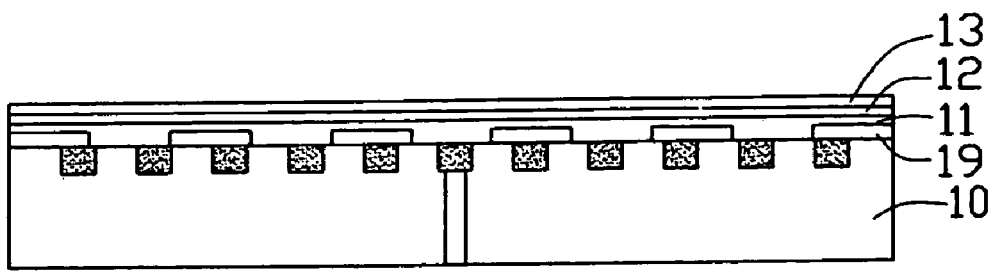
FIG. 5 is similar to FIG. 4, but showing a catalyst layer formed on the first protective layer.

Referring to FIG. 5, a catalyst layer 13 is deposited on the second protective layer 12 by e-beam evaporation, thermal evaporation or sputtering. The catalyst layer 13 can generally be iron, cobalt, nickel, or any suitable combination alloy thereof. A thickness of the catalyst layer 13 is in the range from 1 nm to 10 nm, and preferably about 5 nm.

Figure 6:
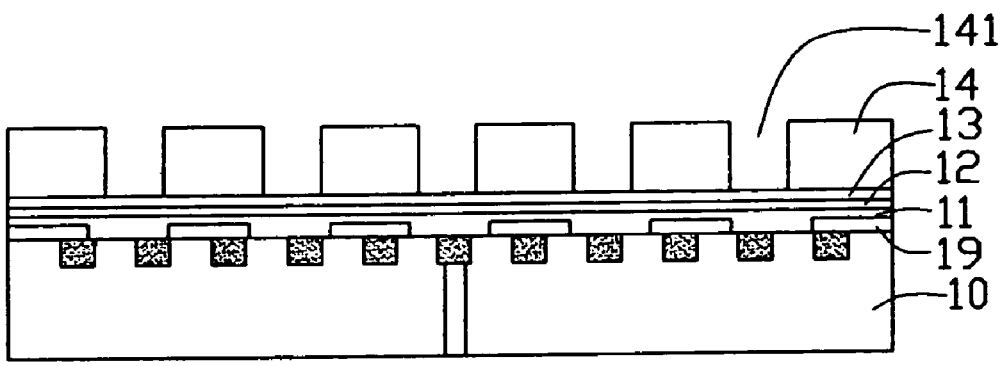
FIG. 6 is similar to FIG. 5, but showing a spacer formed on the catalyst layer.

Referring to FIG. 6, the spacer 14 having a predetermined pattern is formed on the catalyst layer 13 by coating or printing. The spacer 14 is for insulating the gate electrodes 19 from the cathode electrodes 17, and for defining spaces 141 for growing the carbon nanotube arrays 15. The spacer 14 may alternatively be substituted by a thin plate. A surface of the thin plate which is attached to the catalyst layer 13 preferably has a variation in flatness of less than 1 μm. A thickness of the spacer 14 is related to and determined by heights of the carbon nanotube arrays 15. Generally, the thickness of the spacer 14 is in the range from 1 μm to 1 mm, and preferably in the range from 10 μm to 500 μm. The spacer 14 is made of material which is capable of enduring temperatures of about 700° C. Accordingly, the spacer 14 generally comprises material selected from the group consisting of glass, metal coated insulating material, silicon oxide, mica, and ceramic material.

Figure 7:
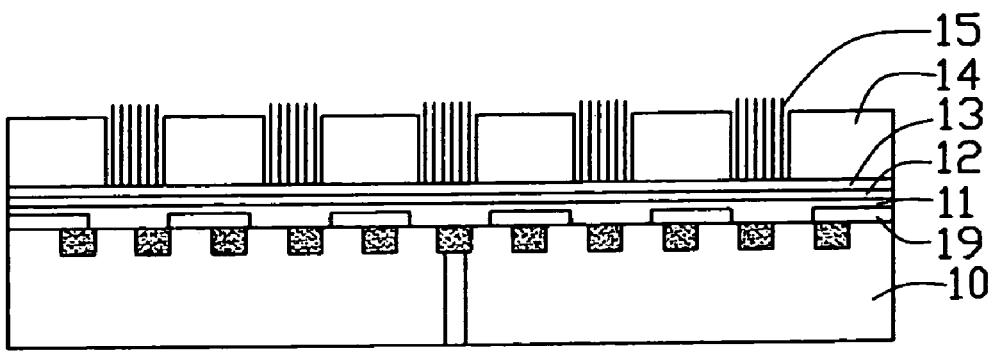
FIG. 7 is similar to FIG. 6, but showing carbon nanotube arrays formed on the catalyst layer of FIG. 6.

Referring to FIG. 7, the carbon nanotube arrays 15 are formed in the spaces 141 defined by the spacer 14 by conventional chemical vapor deposition. The heights of the carbon nanotube arrays 15 are controlled to be approximately equal to the thickness of the spacer 14.

Figure 8:
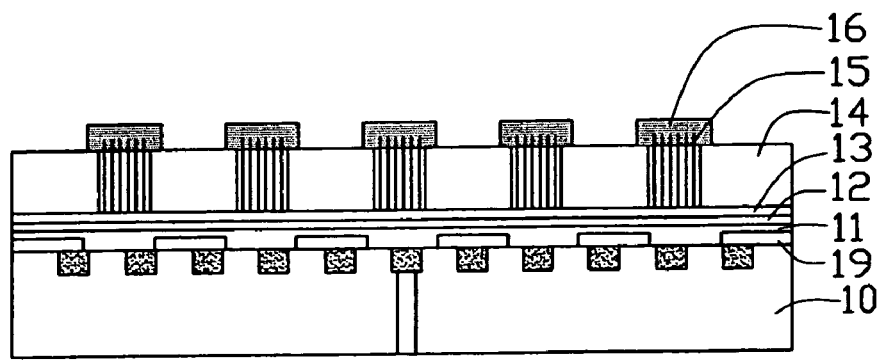
FIG. 8 is similar to FIG. 7, but showing a layer of negative feedback resistance formed on tops of the carbon nanotube arrays.

Referring to FIG. 8, the layer of negative feedback resistance 16 is then formed for the purposes of associated driving circuits. The layer of negative feedback resistance 16 is generally deposited on the carbon nanotube arrays 15 by e-beam evaporation, thermal evaporation or sputtering. The layer of negative feedback resistance 16 can be made of silicon or an oxide of silicon.

Figure 9:
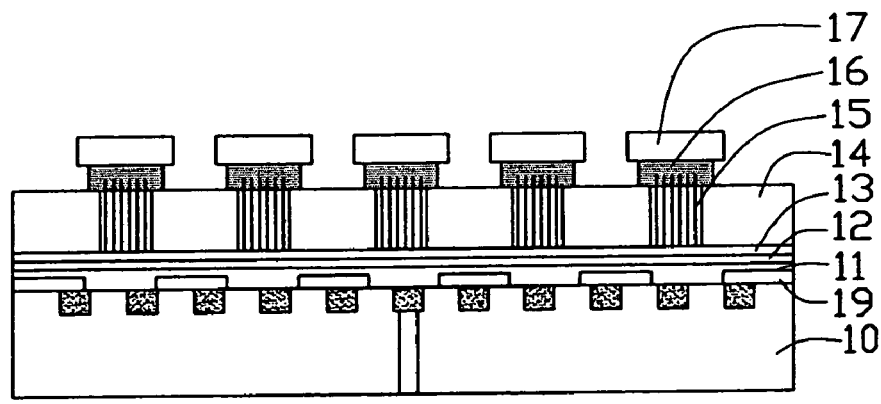
FIG. 9 is similar to FIG. 8, but showing cathode electrodes formed on the layer of negative feedback resistance.

Referring to FIG. 9, the cathode electrodes 17 are formed on the layer of negative feedback resistance 16. The cathode electrodes 17 can be formed by e-beam evaporation, thermal evaporation or sputtering. The cathode electrodes 17 can be made of metallic material. A coefficient of thermal expansion of the metallic material is preferably compatible with those of the first protective layer, the intermediate layer 11, the second protective layer 12, the spacer 14, and the bottom cover 18.

Figure 10:
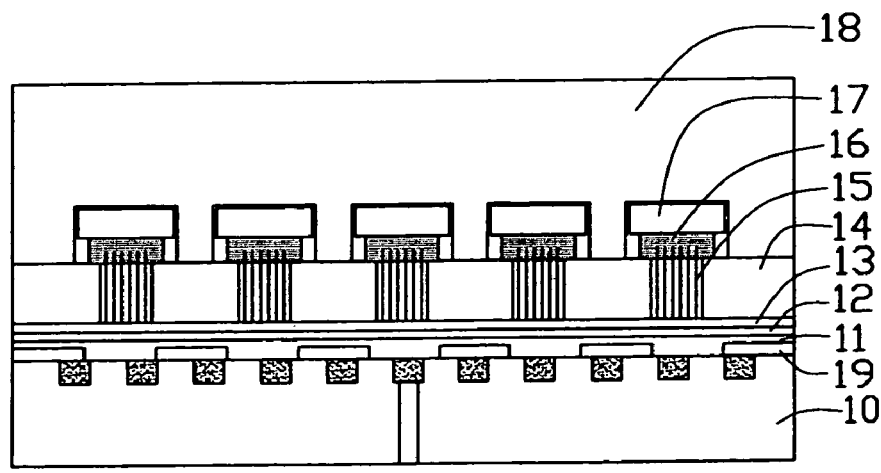
FIG. 10 is similar to FIG. 9, but showing the cathode electrodes packaged with a cover.

Referring to FIG. 10, the cathode electrodes 17 are packaged with a bottom cover 18 by printing, fusion or a suitable bonding method. The bottom cover 18 can be made of glass, plastic, or ceramic material.

Figure 11:
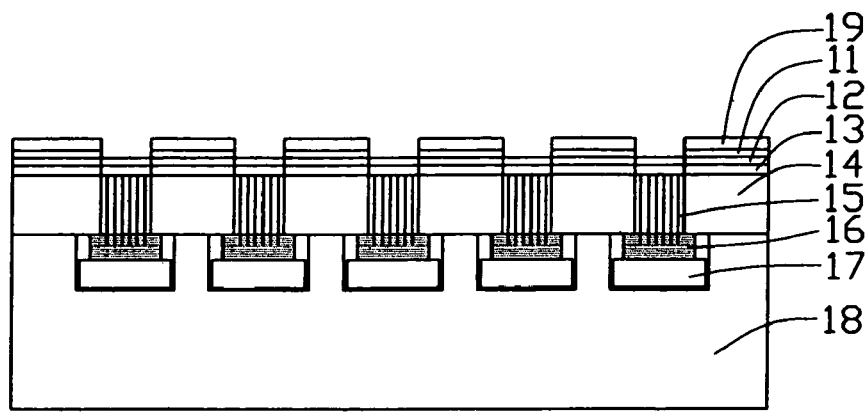
FIG. 11 is similar to FIG. 10, but showing the subassembly thereof inverted, with the detachable substrate removed, and unwanted portions of the first protective layer and the intermediate layer removed.

Referring to FIG. 11, the detachable substrate 10 is removed, and portions of the first protective layer and intermediate layer 11 are removed by a wet etching process. Said portions correspond to positions of the carbon nanotube arrays 15.

Figure 12:
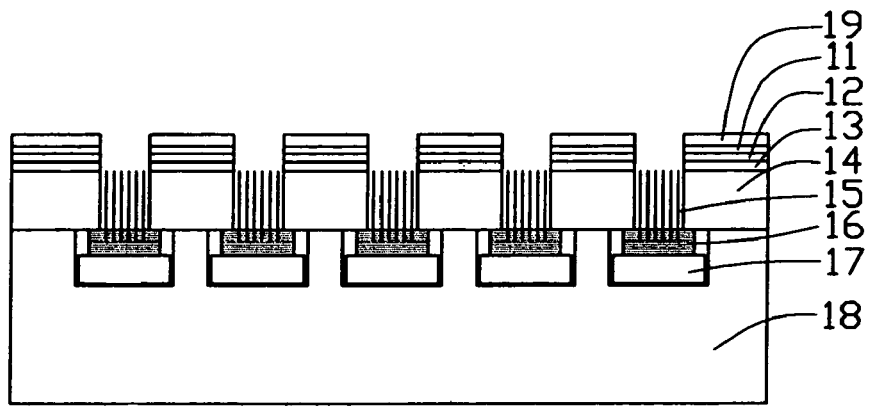
FIG. 12 is similar to FIG. 11, but showing unwanted portions of the second protective layer removed.

Referring to FIG. 12, portions of the second protective layer 12 are removed by a dry etching process. Said portions correspond to the positions of the carbon nanotube arrays 15. A laser is applied to remove corresponding portions of the catalyst layer 13, in order to expose the second ends of the carbon nanotube arrays 15 to the gate electrodes 19. Preferably, the laser is also applied to the second ends of the carbon nanotube arrays 15 themselves, to clean said second ends.

Referring to FIG. 13, a display screen is provided. The display screen comprises a glass substrate 21 with the anode electrode 20 formed thereon, and phosphor layers 22 formed on the anode electrode 20. The display screen is attached to the subassembly obtained in step 12.

While the present invention has been described with reference to particular embodiments, the description is illustrative of the invention and is not to be construed as limiting the invention. Therefore, various modifications can be made to the described embodiments by those skilled in the art without departing from the true spirit and scope of the invention as defined by the appended claims.

The invention claimed is:

1. A method for making a field emission display, the method comprising the steps of:
   (1) providing a detachable substrate having a planar surface;
   (2) forming gate electrodes in a predetermined pattern on the planar surface of the detachable substrate;
   (3) forming an intermediate layer on the gate electrodes;
   (4) forming a catalyst layer on the intermediate layer;
   (5) forming a spacer on the catalyst layer, in a configuration corresponding to a predetermined pattern;
   (6) forming carbon nanotube arrays extending from the catalyst layer;
   (7) forming cathode electrodes on first ends of the carbon nanotube arrays; and
   (8) removing the detachable substrate, and removing portions of the intermediate layer corresponding to positions of the carbon nanotube arrays so as to expose opposite second ends of the carbon nanotube arrays to the gate electrodes.

2. The method as recited in claim 1, further comprising the following step after step (1):
   forming a first protective layer on the planar surface of the detachable substrate;
   and wherein in step (2) the gate electrodes are formed on the first protective layer.

3. The method is recited in claim 2, wherein a thickness of the first protective layer is in the range from 10 nm~10 µm.

4. The method as recited in claim 2, wherein the first protective layer comprises material selected from the group consisting of glass, metal coated insulating material, silicon, silicon oxide, mica, and ceramic material.

5. The method as recited in claim 1, wherein the intermediate layer comprises material selected from the group consisting of glass, silicon, silicon oxide, mica, and ceramic material.

6. The method as recited in claim 1, wherein a thickness of the intermediate layer is in the range from 1 µm~1000 µm.

7. The method as recited in claim 6, wherein the thickness of the intermediate layer is in the range from 10 µm~200 m.

8. The method as recited in claim 1, further comprising the following step after step (3):
   forming a second protective layer on the intermediate layer;
   and wherein step (4) the catalyst layer of is formed on the second protective layer.

9. The method as recited in claim 8, wherein a thickness of the second protective layer is in the range from 10 nm~1000 nm.

10. The method as recited in claim 8, wherein the second protective layer comprises material selected from the group consisting of glass, silicon, silicon oxide, mica, and ceramic material.

11. The method as recited in claim 8, further comprising the following step after step (8):
    removing portions of the second protective layer corresponding to the positions of the carbon nanotube arrays so as to expose opposite second ends of the carbon nanotube arrays to the gate electrodes.

12. The method as recited in claim 1, wherein the spacer comprises material selected from the group consisting of glass, metal coated insulating material, silicon, silicon oxide, mica, and ceramic material.

13. The method as recited in claim 1, wherein a thickness of the spacer is in the range from 1 µm to 1 mm.

14. The method as recited in claim 13, wherein the thickness of the spacer is in the range from 10 µm~500 m.

15. The method as recited in claim 1, wherein step (7) comprises the steps of:
    forming a layer of negative feedback resistance on the first ends of the carbon nanotube arrays; and
    forming cathode electrodes on the layer of negative feedback resistance.

16. The method as recited in claim 15, wherein the negative feedback resistance comprises silicon or an oxide.

17. The method as recited in claim 1, wherein a thickness of the catalyst layer is in the range from 1 nm to 10 nm.

18. The method as recited in claim 1, further comprising the following step after step (8):
    applying a laser to the carbon nanotube arrays in order to remove the catalyst layer.

19. A method of making a field emission display, comprising steps of:
    providing a detachable substrate;
    locating a catalyst layer and an gate electrode on said substrate;
    growing carbon nanotube arrays on said catalyst layer with roots of the carbon nanotube arrays extending from the catalyst layer;
    locating a barrier upon said substrate;
    disposing a cathode electrode upon the barrier under a condition that tips of carbon nanotubes of said carbon nanotube arrays are embedded in said cathode electrode;
    removing said substrate including said catalyst layer and exposing said roots adjacent to said gate electrode; and
    positioning an anode electrode spatially away from said roots opposite to said cathode electrode.

* * * * *